United States Patent [19]

Kashiwabara

[11] Patent Number: 5,007,398

[45] Date of Patent: Apr. 16, 1991

[54] ALCOHOL SENSOR FAILURE DETECTION SYSTEM FOR INTERNAL COMBUSTION ENGINE

[75] Inventor: Masuo Kashiwabara, Gunma, Japan

[73] Assignee: Japan Electronic Control Systems Co., Ltd., Isezaki, Japan

[21] Appl. No.: 507,835

[22] Filed: Apr. 12, 1990

[51] Int. Cl.$^5$ .............................................. F02D 41/22
[52] U.S. Cl. ..................... 123/479; 123/1 A; 123/489; 123/494; 123/575; 73/117.3
[58] Field of Search ............... 123/479, 494, 1 A, 489, 123/575; 73/117.3

[56] References Cited

U.S. PATENT DOCUMENTS 4,957,087  9/1990  Ota .................................... 123/479

FOREIGN PATENT DOCUMENTS 56-98540  8/1981  Japan .

Primary Examiner—Andrew M. Dolinar
Attorney, Agent, or Firm—Foley & Lardner

[57] ABSTRACT

In an alcohol sensor failure detection system for an internal combustion engine, a failure of an alcohol sensor is detected utilizing an air/fuel ratio dependent correction coefficient during a FEEDBACK control being executed to maintain an air/fuel ratio of an air/fuel mixture at a target value with a fuel supply amount which is corrected by the correction coefficient. The correction coefficient is variable between predetermined maximum and minimum values depending on a monitored air/fuel ratio of the air/fuel mixture. When the correction coefficient is retained to the maximum or minimum value for no less than a predetermined time, the failure of the alcohol sensor is determined.

8 Claims, 3 Drawing Sheets

ALCOHOL SENSOR FAILURE DETECTION SYSTEM FOR INTERNAL COMBUSTION ENGINE

BACKGROUND OF THE INVENTION

1. Field of the Invention

The present invention generally relates to a detection system for an alcohol sensor failure in an internal combustion engine. More specifically, the present invention relates to such an alcohol sensor failure detection system that can detect the failure of the alcohol sensor with high accuracy.

2. Description of the Background Art

An alcohol internal combustion engine has been proposed, such as disclosed in Japanese Patent First Publication No. 56-98540, wherein a gasoline-alcohol mixed fuel is used in place of a pure gasoline fuel. Generally, methanol or ethanol is employed as an alcohol component.

In this publication, an alcohol sensor is provided for monitoring alcohol concentration contained in the mixed fuel to control a fuel injection amount and an ignition timing based on a monitored alcohol concentration. Naturally, the fuel injection amount and the ignition timing are variable depending on the alcohol concentration because an octane value contained in the gasoline-alcohol mixed fuel and the pure gasoline fuel is different from each other. An oxygen sensor ($O_2$ sensor) is further provided for monitoring oxygen concentration contained in an exhause gas so as to perform a FEEDBACK or CLOSED LOOP control of the fuel injection amount to maintain an air/fuel ratio of an air/fuel mixture at a stoichiometric value in a predetermined engine driving range.

In the alcohol internal combustion engine as noted-above, since the fuel injection amount and the ignition timing are controlled based on the monitored alcohol concentration, when the alcohol sensor malfunctions, the fuel injection amount and the ignition timing can not be properly controlled resulting in the unstable driving condition of the engine.

For overcoming the above-noted defect, there has also been proposed a fail-safe control which is executed when the failure of the alcohol sensor is detected, so as to maintain the stable driving condition of the engine.

Accordingly, the detection of the malfunction of the alcohol sensor is very important for properly operating the engine. Generally, the alcohol sensor failure has been detected by detecting an abnormal output voltage of the alcohol sensor which is generated due to short or open circuit of a harness in the alcohol sensor. However, a reliable detection of the alcohol sensor failure can not be ensured using the output voltage of the alcohol sensor since the failure of the alcohol sensor does not always cause the alcohol sensor to output the abnormal voltage which deviates from a predetermined reference voltage range, particularly when a degree of the failure is relatively small.

SUMMARY OF THE INVENTION

Therefore, it is an object of the present invention to provide an alcohol sensor failure detection system for an internal combustion engine that can eliminate the above-noted defect inherent in the background art.

It is another object of the present invention to provide an alcohol sensor failure detection system for an internal combustion engine that can detect a failure of an alcohol sensor with high accuracy.

To accomplish the above mentioned and other objects, in an alcohol sensor failure detection system for an internal combustion engine according to one aspect of the present invention, a failure of an alcohol sensor is detected utilizing an air/fuel ratio dependent correction coefficient during a FEEDBACK control being executed to maintain an air/fuel ratio of an air/fuel mixture at a target value with a fuel supply amount which is corrected by the correction coefficient. The correction coefficient is variable between predetermined maximum and minimum values depending on a monitored air/fuel ratio of the air/fuel mixture. When the correction coefficient is retained to the maximum or minimum value for no less than a predetermined time, the failure of the alcohol sensor is determined.

According to another aspect of the present invention, an alcohol sensor failure detection system for an internal combustion engine comprises air/fuel mixture induction means for receiving an intake air and a fuel to form an air/fuel mixture to be fed into an engine combustion chamber, fuel supply means for supplying a controlled amount of the fuel into the induction means, an alcohol sensor associated with the fuel supply means for producing a first signal indicative of alcohol concentration contained in the fuel to be fed into the induction means from the fuel supply means, sensor means for producing a second signal indicative of an air/fuel ratio of the air/fuel mixture.

The system further includes first means for deriving a first amount of the fuel to be fed into the induction means from the fuel supply means, the first amount derived based on the first signal and predetermined other signals indicative of respective engine operating conditions, second means for deriving a correction coefficient variable between predetermined maximum and minimum values depending on the second signal, the correction coefficient being derived through a FEEDBACK control which is executed in a predetermined engine driving range such that the air/fuel ratio of the air/fuel mixture is maintained at a target value in the predetermined engine operating range with a second amount of the fuel derived by third means which corrects the first amount with the correction coefficient, the second amount of the fuel being fed into the induction means from the fuel supply means.

The system further includes fourth means for determining whether the FEEDBACK control is executed, fifth means, in response to a positive decision of the fourth means, for determining whether the correction coefficient is the predetermined maximum or minimum value, sixth means, in response to a positive decision of the fifth means, for measuring a time in which the correction coeffient is retained to the predetermined maximum or minimum value, and seventh means for determining a failure of the alcohol sensor when the measured time is no less than a predetermined value.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Figure 2:
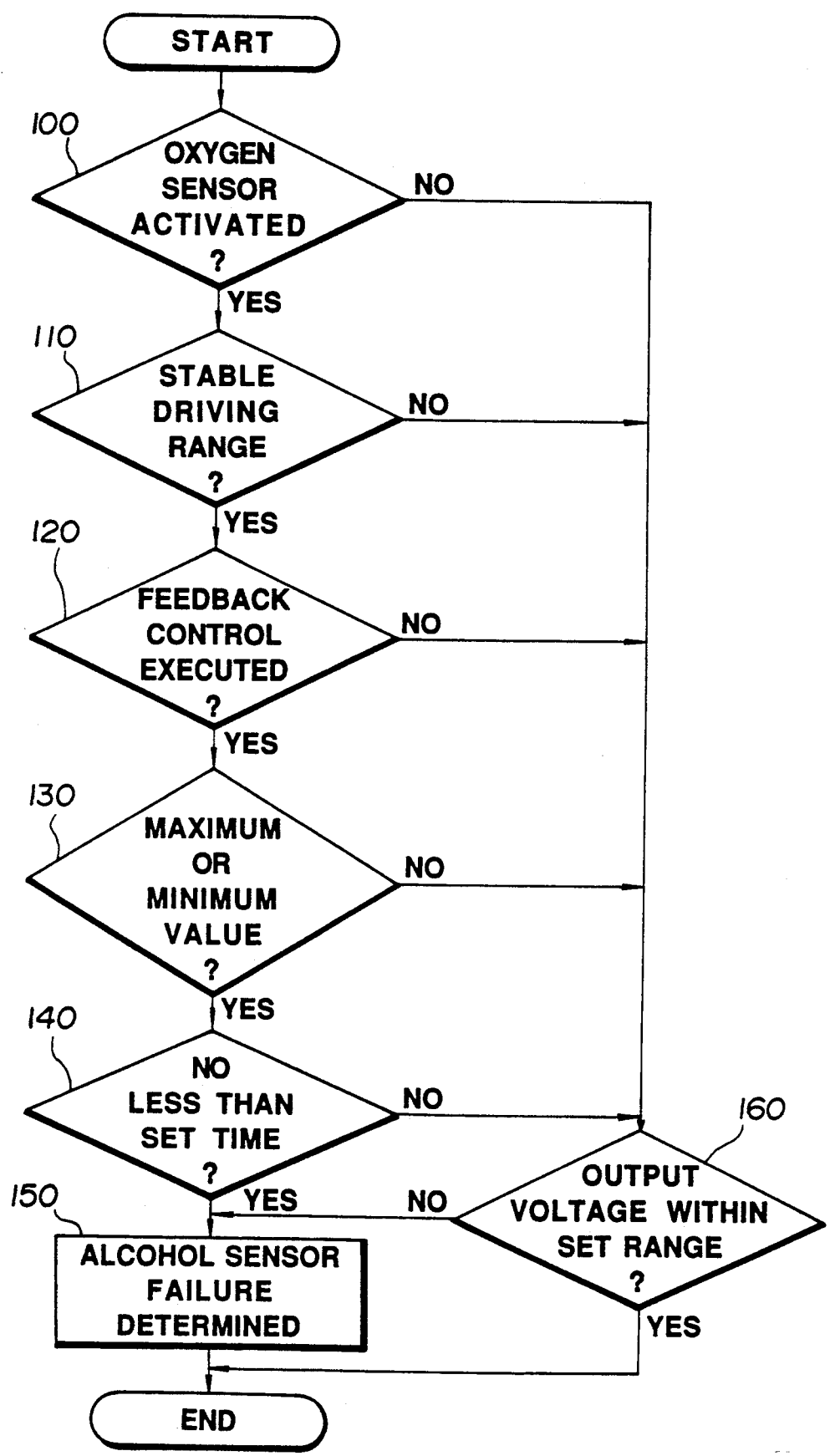
FIG. 2 is a flowchart to be executed by a control unit in the preferred embodiment of FIG. 1 for detecting a failure of an alcohol sensor.
Figure 3:
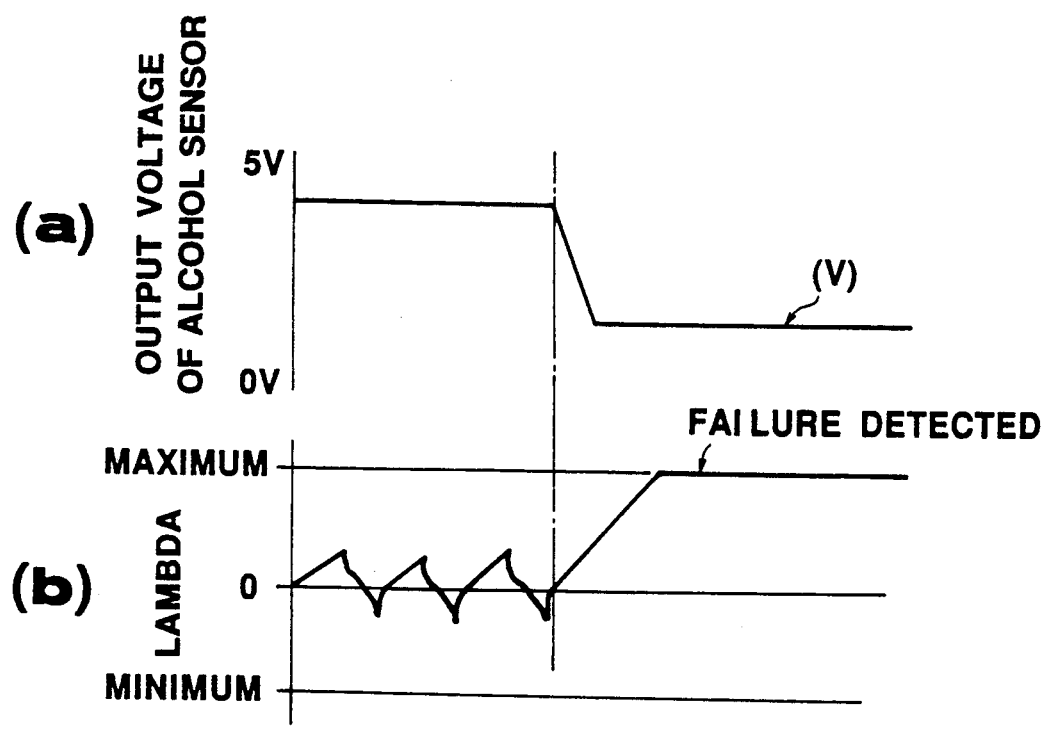
FIG. 3 is a time chart showing a relationship between variation of an output voltage from an alcohol sensor and variation of an air/fuel ratio dependent correction coefficient.

Now, an alcohol sensor failure detection system for an internal combustion engine according to a preferred embodiment of the present invention will be described hereinbelow with reference to FIGS. 1 to 3.

Figure 1:
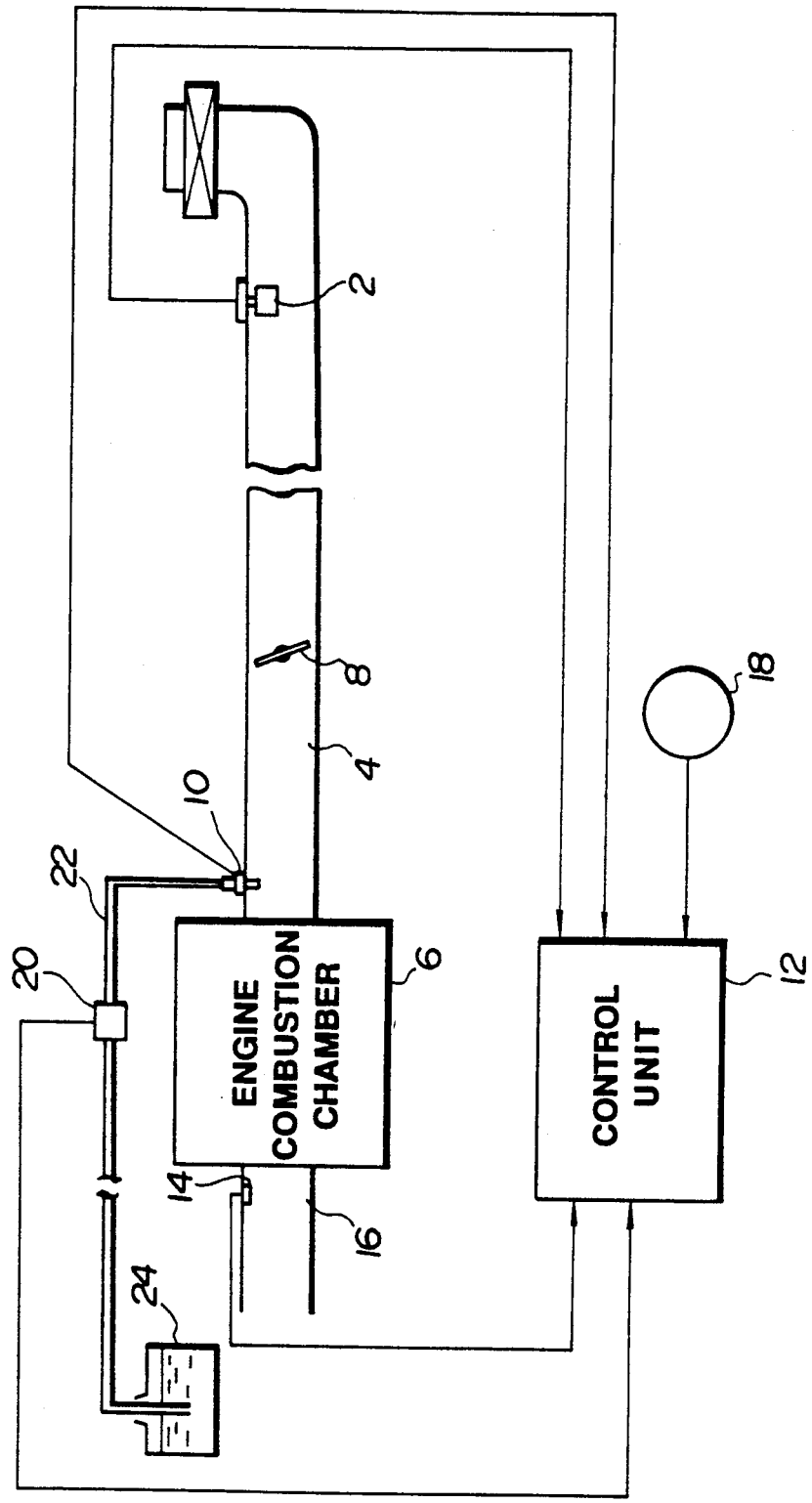
FIG. 1 is a schematic diagram showing an overall structure of an alcohol sensor failure detection system according to a preferred embodiment of the present invention.

FIG. 1 shows an overall structure of the alcohol sensor failure detection system according to the preferred embodiment of the present invention. In FIG. 1, an air-flow meter 2 is provided in an induction passage 4 of an internal combustion engine 6 upstream of a throttle valve 8 for producing a signal indicative of an intake air flow rate passing therethrough, which is to be conducted into respective engine combustion chambers through the throttle valve 8. The throttle valve 8 is interconnected with an accelerator pedal so as to adjust the intake air flow rate passing therethrough according to an accelerator pedal position. In an intake manifold arranged downstream of the throttle valve 8 is disposed an electro-magnetic fuel injection valve 10 per each engine combustion chamber. The fuel injection valve 10 is controlled to open in response to an injection pulse signal output from a control unit 12 to eject the pressurized gasoline-alcohol mixed fuel under a predetermined pressure into the intake manifold so as to form an air/fuel mixture to be fed to the engine combustion chambers. An opening time of the injection valve or a fuel injection time is determined by a pulse width of the injection pulse signal. Since a pressure differential between the intake manifold and the fuel in the fuel passage 22 is controlled to be constant, a total fuel injection amount $T_i$ to be fed through the fuel injection valve 10 is proportional to the fuel injection time. The control unit 12 includes a microcomputer having CPU, RAM, ROM and an input/output circuit as in the known way. The derivation of the injection pulse signal indicative of the total fuel injection amount $T_i$ by the control unit 12 will be described later.

An oxygen sensor 14 is provided in an exhaust passage 16 for monitoring oxygen concentration contained in an exhause gas passing through the exhaust passage 16 to produce a signal indicative of the monitored oxygen concentration. A crank angle sensor 18 is provided in a distributor (not shown) for producing a crank unit angle signal and/or a crank reference angle signal. The control unit 12 calculates an engine revolutional speed by counting pulses of the crank unit angle signal or measuring a cycle period of the crank reference angle signal as in the known way.

An alcohol sensor 20 is arranged in a fuel passage 22 extending between a fuel tank 24 and the fuel injection valve 10 for producing a signal indicative of alcohol concentration contained in the fuel supplied from the fuel tank 24. The control unit 12 calculates the alcohol concentration based on electric capacitance across the alcohol sensor 20 as in the known way. The electric capacitance of the alcohol sensor 20 is variable depending on the alcohol concentration contained in the fuel.

The control unit 12 processes the signals input from the air-flow meter 2, the oxygen sensor 14, the crank angle sensor 18, the alcohol sensor 20 and other known sensors to derive the fuel injection pulse signal indicative of the total fuel injection amount $T_i$ based on the following equation:

$$T_i = T_p \times C_{oef} \times \lambda \times ALC + T_s$$

where, $T_p$ is a basic fuel injection amount derived by the control unit 12 based on an engine revolution speed and an engine load (an intake air flow rate), $C_{oef}$ is a coefficient derived by the control unit 12 based on various engine operating parameters as in the known way, $\lambda$ is a FEEDBACK or an air/fuel ratio dependent correction coefficient derived by the control unit 12 based on the output signal from the oxygen sensor 14, and ALC is a correction coefficient derived by the control unit 12 based on the output signal from the alcohol sensor 20, and $T_s$ is a correction amount derived by the control unit 12 based on a battery voltage.

It is to be appreciated that the FEEDBACK or the air/fuel ratio dependent control based on the signal from the oxygen sensor for maintaining the air/fuel ratio of the air/fuel mixture at a target value, such as a stoichiometric value is performed in a predetermined engine driving range, such as a steady or stable engine driving range. Accordingly, when an OPEN LOOP control is performed under a predetermined unstable engine driving range, the FEEDBACK or the air/fuel ratio dependent correction coefficient $\lambda$ in the above-noted equation is retained to a predetermined fixed value, such as "1".

An operation of the preferred embodiment will be described hereinbelow with reference to FIG. 2 which shows a flowchart of an alcohol sensor failure detection routine to be executed by the control unit 12 for detecting the failure or malfunction of the alcohol sensor 20.

At a first step 100, it is determined whether the oxygen sensor 14 is activated. This determination is executed based on input data about an exhaust gas temperature. If the decision at the step 100 is NO, i.e. the oxygen sensor 14 is deactivated, the routine goes to a step 160, which will be described later. If the decision at the step 100 is YES, i.e. the oxygen sensor 14 is activated, the routine goes to a step 110.

At the step 110, it is determined whether the engine is in the predetermined stable driving range satisfying the FEEDBACK or the air/fuel ratio dependent control condition. If the answer at the step 110 is NO, the routine goes to the step 160, which will be described later. On the other hand, if the decision at the step 110 is YES, i.e. the engine is in the predetermined stable driving range, the routine goes to a step 120.

At the step 120, it is determined whether the FEEDBACK or the air/fuel ratio dependent control is executed. If the decision at the step 120 is NO, i.e. the FEEDBACK control is not executed, the routine goes to the step 160, which will be described later. On the other hand, if the decision at the step 120 is YES, the routine goes to a step 130.

At the step 130, it is determined whether the FEEDBACK or the air/fuel ratio dependent correction coefficient $\lambda$ reaches a set maximum or minimum value. If the decision at the step 130 is NO, i.e. the correction coefficient $\lambda$ does not reach the set maximum or minimum value, the routine goes to the step 160, which will be described later. On the other hand, if the decision at the step 130 is YES, the routine goes to a step 140.

At the step 140, it is determined whether the correction coefficient λ is ratained to the set maximum or minimum value for no less than a predetermined time. If the decision at the step 140 is NO, the routine goes to the step 160, which will be described later. On the other hand, if the decision at the step 140 is YES, i.e. the correction coefficient λ is retained to the set maximum or minimum value for no less than the predetermined time, the routine goes to a step 150.

When the correction coefficient λ is maintained at the set maximum or minimum value for no less than the predetermined time while the FEEDBACK or the air/fuel ratio dependent control is executed, the total fuel injection amount $T_i$ is largely or abnormally deviated from the target value, such as the stoichiometric value, which is out of expectation of the FEEDBACK control system. Accordingly, it is considered that the alcohol sensor does not function properly and that the failure of the alcohol sensor is occurring. As a result, the failure of the alcohol sensor is determined at the step 150.

On the other hand, at the step 160, it is determined whether an output voltage from the alcohol sensor 20 is within a predetermined voltage range. If the decision at the step 160 is YES, i.e. the output voltage is within the predetermined voltage range, the routine goes to END so that no determination of the alcohol sensor failure is made. On the other hand, if the decision at the step 160 is NO, the routine goes to the step 150 where the alcohol sensor failure is determined.

It is to be appreciated that the step 160 is provided as a precaution and may be omitted.

FIGS. 3(a) and 3(b) cooperatively show a relationship between variation of the alcohol sensor output voltage and corresponding variation of the FEEDBACK correction coefficient. In FIG. 3(a), when the alcohol sensor output voltage at a location (V) is within the predetermined voltage range, the failure of the alcohol sensor 20 is not detected as described in the background art. On the other hand, in FIG. 3(b), it is clearly shown that the failure of the alcohol sensor is properly detected through the failure detection routine as described with reference to FIG. 2.

It is to be understood that this invention is not to be limited to the preferred embodiment described above, and that various changes and modifications may be made without departing from the spirit and scope of the invention as defined in the appended claims.

What is claimed is:

1. An alcohol sensor failure detection system for an internal combustion engine, comprising:
    air/fuel mixture induction means for receiving an intake air and a fuel to form an air/fuel mixture to be fed into an engine combustion chamber;
    fuel supply means for supplying a controlled amount of the fuel into said induction means;
    an alcohol sensor associated with said fuel supply means for producing a first signal indicative of alcohol concentration contained in the fuel to be fed into said induction means from said fuel supply means;
    sensor means for producing a second signal indicative of an air/fuel ratio of the air/fuel mixture;
    first means for deriving a first amount of the fuel to be fed into said induction means from said fuel supply means, said first amount derived based on said first signal and predetermined other signals indicative of respective engine operating conditions;
    second means for deriving a correction coefficient variable between predetermined maximum and minimum values depending on said second signal, said correction coefficient being derived through a FEEDBACK control which is executed in a predetermined engine driving range such that the air/fuel ratio of the air/fuel mixture is maintained at a target value in said predetermined engine operating range with a second amount of the fuel derived by third means which corrects said first amount with said correction coefficient, said second amount of the fuel being fed into said induction means from said fuel supply means;
    fourth means for determining whether said FEEDBACK control is executed;
    fifth means, in response to a positive decision of said fourth means, for determining whether said correction coefficient is said predetermined maximum or minimum value;
    sixth means, in respone to a positive decision of said fifth means, for measuring a time in which said correction coeffient is retained to said predetermined maximum or minimum value;
    seventh means for determining a failure of the alcohol sensor when said measured time is no less than a predetermined value.

2. An alcohol sensor failure detection system as set forth in claim 1, further comprising eighth means which, in response to a negative decision of said fourth means or said fifth means, determines whether an output voltage from said alcohol sensor is within a predetermined voltage range, and ninth means which, in response to a negative decision of said eight means, determines the failure of the alcohol sensor.

3. An alcohol sensor failure detection system as set forth in claim 1, wherein said sensor means for producing the second signal is an oxygen sensor which produces a signal indicative of oxygen concentration contained in an exhause gas from the engine.

4. An alcohol sensor failure detection system as set forth in claim 1, wherein said predetermined other signals include those signals indicative of an engine revolution speed and an intake air flow rate, respectively.

5. An alcohol sensor failure detection system as set forth in claim 4, wherein said predetermined other signals further include a signal indicative of a battery voltage.

6. An alcohol sensor failure detection system as set forth in claim 3, further comprising tenth means for determining whether said oxygen sensor is activated, and eleventh means which, in response to a negative decision of said tenth means, determines whether an output voltage from said alcohol sensor is within a predetermined voltage range, and twelfth means which, in response to a negative decision of said eleventh means, determines the failure of the alcohol sensor.

7. An alcohol sensor failure detection system as set forth in claim 6, further comprising thirteenth means which, in response to a positive decision of said tenth means, determines whether the engine is in said predetermined driving range satisfying the FEEDBACK control, said eleventh means, in response to a negative decision of said thirteenth means, determining whether the output voltage from said alcohol sensor is within the predetermined voltage range, said twelfth means, in response to a negative decision of said eleventh means, determining the failure of the alcohol sensor, and said fourth means, in response to a positive decision of said thirteenth means, determining whether said FEED-BACK control is executed.

8. An alcohol sensor failure detection system as set forth in claim 1, wherein said correction coefficient is retained to a predetermined value when the FEED-BACK control is non-executed.

* * * * *